United States Patent [19]

de Vroom

[11] Patent Number: 4,766,038

[45] Date of Patent: Aug. 23, 1988

[54] TRANSFERABLE PAINT FILM AND METHOD FOR ITS MANUFACTURE

[75] Inventor: Hubertus M. de Vroom, Heckenrosenweg, Fed. Rep. of Germany

[73] Assignee: Nordipa AG, Schwerzenbach, Switzerland

[21] Appl. No.: 887,787

[22] Filed: Jul. 21, 1986

[30] Foreign Application Priority Data

Aug. 1, 1985 [DE] Fed. Rep. of Germany ....... 3527609

[51] Int. Cl.[4] ........................ B32B 9/04; B32B 27/06; B41M 3/12; C09J 7/02

[52] U.S. Cl. ...................................... 428/447; 428/40; 428/352; 428/483; 428/914

[58] Field of Search ............... 428/446, 447, 448, 914, 428/483, 480, 40, 352

[56] References Cited

U.S. PATENT DOCUMENTS 4,288,480 9/1981 Grzywinski et al. ........... 428/914 X
4,451,522 5/1984 de Vroom ....................... 428/352 X
4,559,396 12/1985 Sasaki et al. .................... 428/447 X
4,661,182 4/1987 Lerner ............................. 428/40 X
4,684,557 8/1987 Pennace et al. ................ 428/447 X

FOREIGN PATENT DOCUMENTS 3527609 2/1987 Fed. Rep. of Germany ...... 428/352

OTHER PUBLICATIONS

"Handbook of Pressure Sensitive Adhesive Technology", Don Satas ed., 1982, Chapter 11, pp. 220–275; Chapter 18, pp. 384–401; Chapter 22, pp. 438–449.

*Primary Examiner*—John E. Kittle
*Assistant Examiner*—Susan S. Rucker
*Attorney, Agent, or Firm*—Barnes & Thornburg

[57] ABSTRACT

The invention relates to a transferable paint film which has a silicone layer serving as a separating layer, said silicone layer being highly cross-linked and of the alkenyl-group-containing polyaddition type and including an adhesive layer as well as a paint layer. The paint layer can be peeled off along with the adhesive layer by hand, and stuck on a surface to be treated with paint.

18 Claims, No Drawings

TRANSFERABLE PAINT FILM AND METHOD FOR ITS MANUFACTURE

The invention relates to a transferable paint film including a carrier film, a silicone layer acting as a release layer, an adhesive layer, and at least one paint or varnish layer.

A paint film of this general type is described in published European Patent Application No. 50 794. The paint film described in that publication has, in addition, a neutralizing layer with a waxy consistency located on the silicone layer serving as a loosening or separating layer. The silicone layer is of the dimethylsiloxane type. The waxy neutralizing layer permits the formation and adhesion of a uniform, smooth paint layer of any kind on the carrier film. For example, paint films with paint layers are described which consist of original motor vehicle paints. The original motor vehicle paint occurs on the transferable paint film as a dry material a user can easily carry with him and apply as needed to repair damaged spots on a vehicle body.

The paint film according to the present invention has the advantage over those films previously described in that the neutralizing layer is rendered superfluous by using a highly cross-linked silicone layer of the polyaddition type. Accordingly the present paint film can be manufactured with lower material and labor cost. Adhesive layers can be applied with no wetting problems directly, uniformly and with good adhesion to a carrier film coated with a cross-linked silicone layer according to this invention, yet the adhesive layers can be easily removed again if required without having changed their properties. This characteristic advantage of the present invention is realized by the high degree of cross linking of the silicone layer. Hence, migration of free silicones into the other layers is largely avoided. When free silicones migrate into the other layers, the former can react chemically with one or more components of the layers and/or attach themselves physically to components of the other layers resulting in material losses of paint and/or adhesive and hence having an adverse effect on product guality.

Silicone polymers of the polyaddition type are described in the art. They can be prepared, for example, by reacting organosilicon compounds with hydrogen on the silicon atom with silicon compounds bearing unsaturated groups.

Silicone layers of the polyaddition type containing alkenyl groups, and especially vinyl groups, have proven to be especially suitable for the present application. Highly cross linked silicone layers of the silicone rubber type which meet all of the requirements posed here can be made in a very short time. The silicone layers can be prepared by the following reaction:

$$-\overset{|}{\underset{|}{Si}}-H + -\overset{|}{C}=\overset{|}{C}- \longrightarrow -Si-\overset{|}{\underset{|}{C}}-\overset{|}{\underset{|}{C}}-H$$

Further advantages regarding the course of silicone layer formation and the desired effect of the silicone layer as a release layer are achieved if the latter has a skeleton of dimethylpolysiloxane groups.

Plastic films are especially suitable as carrier films for the present application. The plastic films must have a smooth surface to produce a uniform, smooth paint layer. The plastic film must also be mechanically sturdy to prevent tearing and creasing during subsequent manufacturing processes. The carrier film should also be chemically resistant, especially against organic solvents which are present in the other components of the transferable paint film when they are applied to the carrier film. The plastic films should also be heat resistant at the temperatures which occur in the paint drying and paint stoving processes, i.e. between 100° C. and 150° C. It has been found that polyester films, especially polyethylene terephthalate films, are especially suited for the present application. Use of other plastic films is also possible.

The adhesive layer must also satisfy a number of conditions if it is to be used for the paint film according to this invention. It must be self adhesive and possess a high adhesive power, especially with respect to metal, plastic, and wood surfaces. Its adhesive power must also remain after the paint film dries or cures. Consequently the adhesive layer must be chemically resistant to the solid and liquid components such as solvents contained in the paints used. For example, if two component paints with an acrylate resin base are used, the components of the adhesive layer should not cross link with the isocyanates contained in these paints if adhesive losses or losses of adhesive action are to be avoided. Styrene isoprene-styrene block polymer system adhesives and styrene butadiene block polymer system adhesives are very well suited for the paint film according to the present invention. Alternatively, non-cross-linking acrylic adhesives with a solvent or water base, especially as dispersions, can be used as well as neoprene adhesives, chlorinated rubber adhesives, polyisobutylene adhesives, and adhesives made from chlorinated hydrocarbons.

It has been found in practice that a carrier film provided with a highly cross-linked silicone layer according to this invention can readily be used to produce a uniform paint film with good adhesion if it is provided with the adhesive layer before the paint film is applied. The result is a product in which the paint is the uppermost layer. The paint film can simply be peeled off the carrier film along with the adhesive by hand, and applied directly to the object to be treated with paint.

To manufacture the present transferable paint films, a system containing a solvent, at least one organosilicon compound with hydrogen on its silicon atom, at least one organosilicon compound containing alkenyl groups, and a platinum or iridium catalyst, first is sprayed onto one side of a strip-shaped carrier film with a suitable device. Alternatively, if the system containing the solvent has a higher viscosity it can be applied to the carrier film with a blade. As mentioned above, organosilicon compounds containing vinyl groups are especially suited for preparation of the highly cross-linked silicone release layer. In this way, the highly cross-linked silicone can be formed within a few seconds at room temperature. After subseguent drying, a uniform silicone layer is deposited on the carrier film. The drying temperature then depends on the solvent used and the nature of the carrier film. In the case of polyethylene terephthalate films the temperature can be up to 150° C. A certain amount of cross linking of the silicone layer still occurs during drying. Silicone layers one to a few microns thick have proven especially suitable for producing a paint film according to the invention.

A uniformly thick adhesive layer can be produced especially easily on a carrier film provided with the cross-linked silicone layer described above by spray application, or using a blade, depending on viscosity, of an adhesive/solvent system, preferably containing a relatively non-volatile solvent. Reliable wetting of the silicone layer as well as relatively rapid drying of the adhesive layer are possible with the aid of the proposed solvent.

If the film thus produced is not to be immediately processed further, i.e. provided with one or more paint layers, it can be covered with a strip-shaped cover film which must have the characteristic that it does not damage the adhesive layer. Thus, the film can easily be stored in sheets one or more layers deep or rolled up until it is processed further. Another possibility is to provide the back of the carrier film with a separating layer. Then the film can be stored in sheets several layers deep or rolled up until it is processed further.

Damage to the adhesive layer is avoided and/or the cover film is guaranteed to be smoothly removable if the cover film is itself provided with a release layer on the surface contacting the adhesive layer.

Thus polyester films, especially polyethylene terephthalate films are especially suited as cover films, especially when coated with a silicone layer according to the invention. It is sufficient in this connection to use a film with a smaller thickness than that of the carrier film as the cover film, since the latter is subjected to less mechanical stress than the former.

In addition, papers coated with a silicone layer according to the invention are especially suitable as cover films.

The paint is applied in liquid form to the adhesive layer and then dried. The process is repeated in the case of multilayer paints. Then the product can either be rolled up or cut in pieces for storage. If necessary, a piece whose size corresponds to that of the area to be covered with paint can be cut from the product. The paint film can be peeled off the silicone-coated carrier film by hand together with the adhesive layer, and can be applied to the surface to be treated in the manner of a plaster.

The paint film according to the invention, can also be prepared by cutting out individual areas of the paint film flush with one another and the adhesive layer from the areas laterally abutting them. The individual areas can be cut out by a stamping process. In this manner, even sharply delimited self-adhesive symbols, numbers, and letters composed of paint can be produced efficiently.

Embodiments for the composition and form of the individual components of the new paint film are described below.

The new paint film is preferably manufactured by a continuously operating device, as described in EP 50 794 and shown schematically therein. A polyethylene terephthalate film approximately 50 to 80 microns thick and about one meter wide is used as the carrier film for the paint film, and is rolled up. This carrier film possesses optimum properties for manufacturing the paint film according to this invention, because its surface is smooth, and it exhibits outstanding mechanical, chemical, and thermal resistance. The carrier film is fed to the device endlessly from the roll or in sheets. This carrier film is provided in a preceding process with a silicone layer approximately one micron thick on one side, said layer being highly cross linked and of the alkenyl group containing, especially vinyl group containing, polyaddition type. The carrier film is then dried at approximately 150° C. The surface tension of the silicone layer is 22 dynes/cm. The mean separating value of the silicone layer was found to be 11.25±3.75 cN/cm with the test method described below:

A strip of carrier film 4 cm wide and of any length, preferably several tens of centimeters, is covered on the silicone coated side with a piece of test adhesive tape of the same width and approximately the same length. The test adhesive tape is a polyvinylchloride film to which a rubber-based adhesive layer is anchored. Such a test adhesive tape is available for example under the name of Tesa 154 from the firm of Beiersdorf AG, Hamburg. The test adhesive tape is placed against the silicone layer together with the adhesive layer and the sample is stored for approximately 20 hours at room temperature at a pressure of 8 to 10 kPa. Then the mean separating value is determined by using a suitable instrument to measure the peeling force of several samples.

At a pulling angle of 180° and a pulling speed of 1000 mm/min, an average separating value of 45±15 cN was obtained for 4 cm-wide silicone-coated carrier film strips of the type described above, corresponding to 11.25±3.75 cN/cm. The adhesive layer remained completely on the polyvinylchloride film and the silicone layer remained completely on the carrier film. A carrier film coated in this manner has been shown to be optimally suited for the present application.

A highly viscous trichloroethylene-containing styrene-isoprene-styrene block polymer system for creating an adhesive layer is applied by a blade to the silicone coated side of the carrier film.

The adhesive is applied in a quantity such that an adhesive layer 10 to 14 g/m$^2$ is produced after it dries. Then the carrier film is dried at a temperature above 85° C. The adhesive layer thus produced is self-adhesive and possesses great adhesive power, i.e. with respect to metal, plastic, and glass surfaces which can also be painted, as well as a high degree of cohesion.

Motor vehicle paint is applied to the adhesive side of the carrier film thus prepared and cooled. If a uniform shade is desired, a solvent containing two component acrylic isocyanate system is uniformly applied by spraying and then dried. The system then cross-links with good adhesion to the adhesive layer. The process is continued until a paint film thickness of about 20 to 40 microns is reached. The paint film thus produced is strong, highly flexible, color fast, and weatherproof.

If a metallic shade is desired, a physically drying acrylic paint is sprayed uniformly on the adhesive layer as the first layer, and dried. The paint adheres reliably to the adhesive layer. Then a two component acrylic isocyanate varnish is sprayed on and dried. The varnish adheres reliably to the first paint layer. The total thickness of the paint layer in this case is again approximately 25 to 45 microns. This paint film corresponds, in terms of paint layer structure and hence in optical effect, to that of the original metallic motor vehicle stoving paint, is strong, very flexible, color-fast, and weatherproof.

In both embodiments there is initially a continuous paint layer in the paint film. Then individual handy-sized portions of the paint layer are cut out by stamping from the paint layer areas laterally abutting them, so that the adhesive layer areas beneath are picked up and cut out as well. Then the paint film is cut into pieces and packaged. The user can peel dry paint layer sections free by hand when required from the pieces and stick them down by pressing the adhesive layer side against the areas to be repaired. It makes no difference whether the silicone layer has already been cut out in places by the stamping process described above. The silicone layer sticks so little to the adhesive layer that it is not pulled free.

Of course it is also possible to cut the paint film directly into pieces without a previous stamping process, and to package it. The user can then cut pieces of the desired size to fit as needed.

Satisfying results have been obtained by using a film purchased from B. Laufenberg und Sohn KG, Krüser Strasse 5-13, D-4150 Krefeld 29, under the designation transparent polyester film 75 microns thick siliconised on one side by type 40 B 2, which film was processed as described herein before.

What is claimed is:

1. A transferable paint film consisting essentially of a carrier film,
   a silicone layer on said carrier film acting as a release layer,
   at least one paint or varnish layer, and
   an adhesive layer disposed between the silicone layer and the paint or varnish layer,
   wherein the silicone layer is a cross-linked silicone polymer of the polyaddition type.

2. The transferable paint film of claim 1, wherein the silicone layer is formed by reacting an alkenyl-group-containing organosilicon compound with an organosilicon compound with hydrogen on the silicon atoms in the presence of a platinum or iridium catalyst.

3. The transferable paint film of claim 2, wherein the alkenyl-group containing organosilicon compound is a vinyl substituted organosilicon compound and the silicone layer contains a skeleton of dimethylpolysiloxane groups.

4. The transferable paint film of claim 3, wherein the carrier film is a plastic film which is mechanically sturdy, chemically resistant to organic solvents, heat resistant to temperatures of 100° to 150°C. and has a smooth surface.

5. The transferable paint film of claim 4, wherein the plastic film is a polyester film.

6. The transferable paint film of claim 5, wherein the plastic film is polyethylene terephthalate.

7. The transferable paint film of claim 6, wherein a commercial motor vehicle paint is used as the paint layer.

8. The transferable paint film of claim 7, wherein the motor vehicle paint is a physically drying acrylic paint.

9. The transferable paint film of claim 7, wherein the motor vehicle paint is a chemically curing two component paint on an acrylate resin base.

10. The transferable paint film of claim 7, wherein the adhesive layer is a styrene-isoprene-styrene block polymer based adhesive.

11. The transferable paint film of claim 7, wherein the adhesive layer is a styrene-butadiene block polymer based adhesive.

12. A method of manufacture of a transferable paint film, consisting essentially of a carrier film, a cross-linked silicone polymer layer of the polyaddition type, an adhesive layer and at least one paint or varnish layer, said method consisting essentially of coating a strip-shaped carrier film on one side with a layer of a cross-linked silicone polymer of the polyaddition type, drying the silicone polymer layer, applying an adhesive over the silicone polymer layer to form a uniform adhesive layer, and applying at least one paint or varnish layer over the adhesive layer.

13. The method of claim 12, wherein after the adhesive layer is applied, the adhesive layer is covered with a strip-shaped cover film which does not damage the adhesive layer, and the strip-shaped cover is removed before the at least one paint or varnish layer is applied.

14. The method of claim 12, wherein before the adhesive layer is applied, the strip-shaped carrier film is coated on one side with the silicone layer and is simultaneously or subseguently coated on its opposite side with a separating layer.

15. The method of claim 12, wherein the silicone layer is applied as silicone polymer-forming system comprising a solvent, at least one organosilicon compound with hydrogen on the silicon atom, at least one organosilicon compound with alkenyl groups, and a platinum or iridium catalyst.

16. The method of claim 15, wherein the adhesive layer is applied by spraying, or using a blade to spread, an adhesive system containing a relatively nonvolatile solvent and a polymeric adhesive.

17. The method of claim 13, wherein the cover film is provided with a separating layer before use.

18. The method according to claim 14, wherein the separating layer is a silicone layer which has lower adhesiveness with respect to the adhesive layer than the silicone layer coating the carrier film on the first side.

* * * * *